United States Patent
Teichgraeber

[15] 3,659,747
[45] May 2, 1972

[54] AUTOMATIC FEEDER

[72] Inventor: James A. Teichgraeber, P.O. Box 632, Emporia, Kans. 66801

[22] Filed: Mar. 4, 1970

[21] Appl. No.: 16,464

[52] U.S. Cl. .................................................222/14, 222/178
[51] Int. Cl. ................................................................B67d 5/30
[58] Field of Search......................222/178, 176, 413, 14–22

[56] References Cited

UNITED STATES PATENTS

| | | | |
|---|---|---|---|
| 2,439,541 | 4/1948 | Hall | 214/83.32 |
| 3,402,851 | 9/1968 | Ciotti et al. | 222/16 |
| 2,913,145 | 11/1959 | Hopkins et al. | 222/16 |
| 2,366,925 | 1/1945 | May | 222/14 |
| 2,711,696 | 6/1955 | Rowell | 222/14 X |
| 3,351,243 | 11/1967 | Kennedy et al. | 222/178 X |
| 1,915,757 | 6/1933 | Pierce | 214/83.32 |
| 1,915,758 | 6/1933 | Pierce | 214/83.32 |
| 3,393,835 | 7/1968 | Kantor et al. | 222/176 X |

Primary Examiner—Samuel F. Coleman
Attorney—John H. Widdowson

[57] ABSTRACT

This invention is an automatic feeder mountable on a movable vehicle. It has a frame mounting a hopper, and an auger with a discharge spout extended from the vehicle, and is operable by a control system and powering means. The automatic feeder is mountable on a vehicle, powerable therefrom and operable to deliver automatically a substantially certain amount of material from the hopper.

3 Claims, 7 Drawing Figures

Patented May 2, 1972

INVENTOR.
JAMES A. TEICHGRAEBER

BY John H. Widdowson

ATTORNEY

Patented May 2, 1972
3,659,747
2 Sheets-Sheet 2
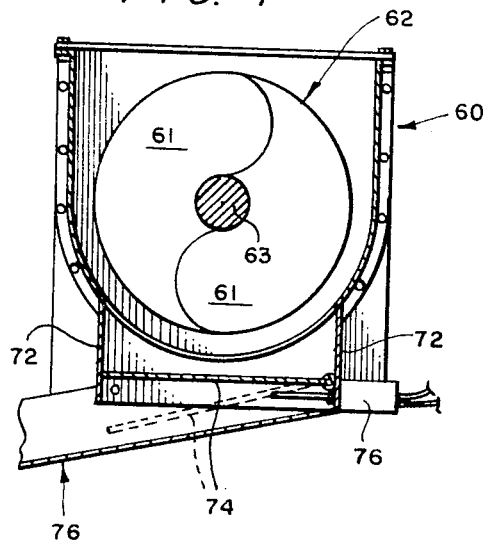
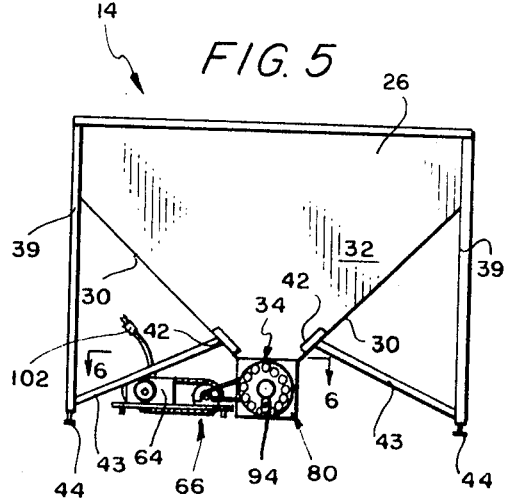
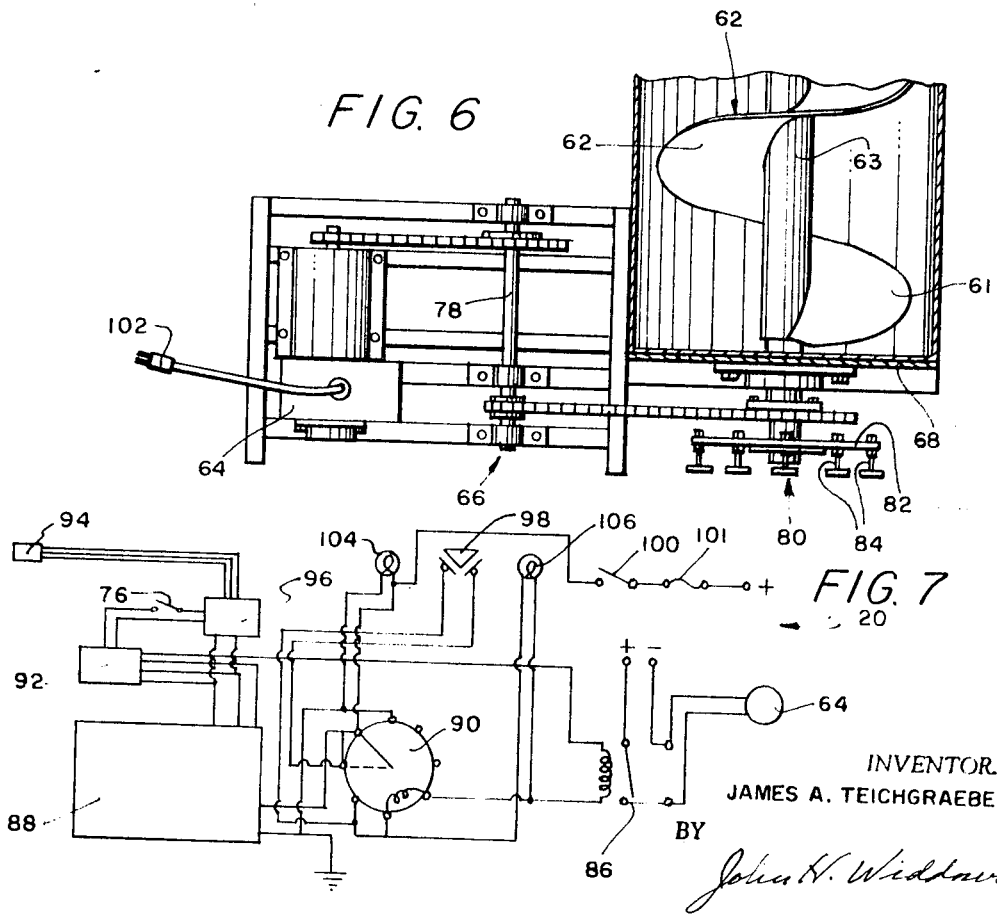
INVENTOR.
JAMES A. TEICHGRAEBER
BY
John H. Widdowson
ATTORNEY

AUTOMATIC FEEDER

Numerous means are known to the prior art for the automatic or semi-automatic dispersal of relatively dry feed to livestock and the like. However, these prior art devices are made permanent fixtures to the feeding trough structure or surrounding structure, or these devices are mobile and dispense feed while in motion only. Additionally, the prior art devices have no means to accurately dispense a specific amount of feed with repeated accuracy or dispense that amount accurately should the supply hopper become empty when in the dispensing operation.

In one preferred embodiment of this invention, an automatic feeder provided includes a hopper to receive and contain feed which is adapted to mount in the bed of a standard pickup truck and an auger to dispense feed from the hopper controlled to dispense exact amounts of feed by carefully controlling the rotation of the auger screw. The hopper preferably includes a V-shaped housing with a rectangular planform joining the auger on the bottom thereof. The auger preferably includes an auger screw rotated by a motor at one end and having a spout at the other end extended from the auger to disperse the feed. Dispensing of the feed is controlled by counting and exactly controlling rotation of the auger screw is preferably controlled by an electrical counting and control system.

One object of the automatic feeder of this invention is to overcome the aforementioned disadvantages of the prior art devices.

Still one other object of this invention is to provide an automatic feeder which can be easily mounted with and removed from a standard pickup vehicle and easily transported in use by the vehicle.

Still another object of this invention is to provide an automatic feeder which allows one person to accurately and repeatedly dispense specified portions of feed.

Still another object of this invention is to provide an automatic feeder that will signal an operator when the hopper is empty and feed is no longer being dispensed so he can refill the hopper, return to where he was dispensing the feed and resume without substantially varying the amount of feed dispensed in that particular portion.

Still another object of this invention is to provide an automatic feeder which will dispense different and variably selected size weight portions from various kinds of feed which can vary in weight dependent upon the particular kind of feed.

One further object of this invention is to provide an automatic feeder which allows one person using the feeder to distribute a greater amount of feed than several people could using conventional methods.

Various other objects, advantages, and features of the invention will become apparent to those skilled in the art from the following discussion, taken in conjunction with the accompanying drawings, in which:

FIG. 4 is a cross section view of the auger taken on line 4—4 of FIG. 3;

FIG. 5 is an end elevation view of the automatic feeder taken on line 5—5 of FIG. 3;

FIG. 6 is a partial cross section view of the auger and driving motor taken on line 6—6 of FIG. 5; and FIG. 7 is a schematic diagram of the electric system of the automatic feeder.

Figure 1:
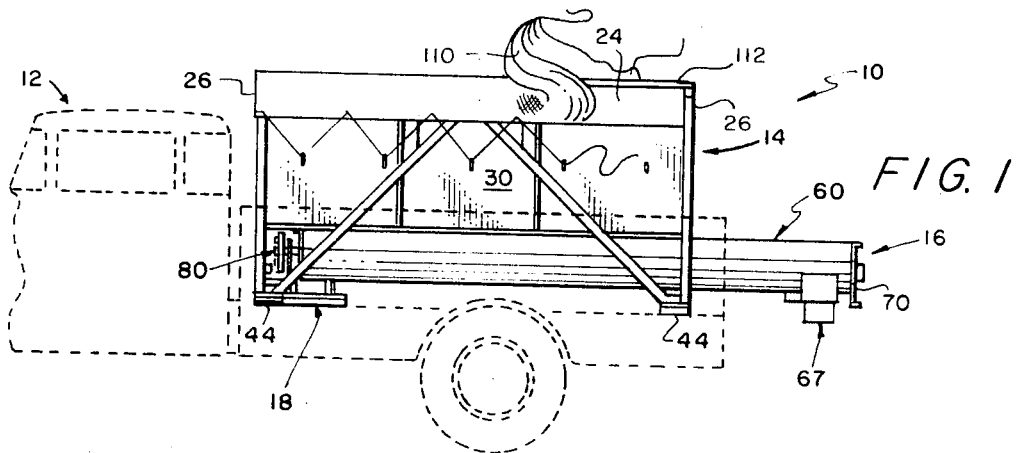
FIG. 1 is a side elevation view of a preferred specific embodiment of the automatic feeder of this invention mounted in the bed of a conventional pickup truck with the pickup truck shown in outline and having a cover partially removed from the top of the hopper.
Figure 2:
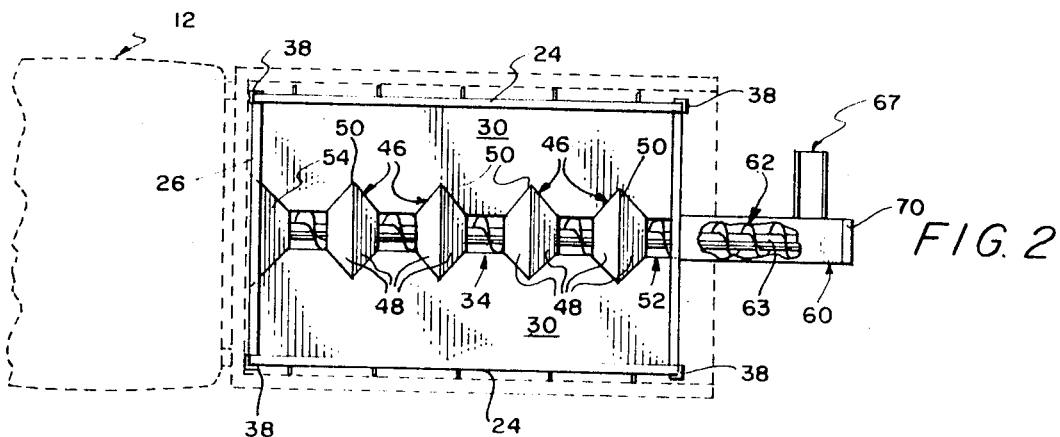
FIG. 2 is a top plan view of the feeder as shown in FIG. 1 with the cover removed.
Figure 3:
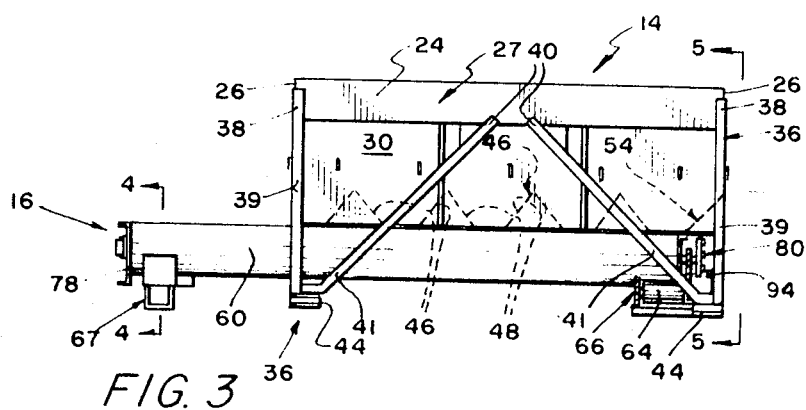
FIG. 3 is a side elevation view of the automatic feeder taken from the right side as seen from the rear of the truck.

The following is a discussion and description of preferred specific embodiments of the new automatic feeder of this invention, such being made with reference to the drawings whereupon the same reference numerals are used to indicate the same or similar parts and/or structure. It is to be understood that such discussion and description is not to unduly limit the scope of the invention.

Referring to the drawings in detail and in particular to FIG. 1, the automatic feeder of this invention, generally indicated at 10, is shown mounted in the bed of a conventional pickup truck 12. The automatic feeder 10 generally includes a hopper 14, an auger 16 and a powering motor 18 and a control system 20, shown schematically in FIG. 7.

The hopper 14 includes a regular shaped rectangular top portion 27 with long sides 24 and ends 26, with sloping sidewalls 30 on the long sides and vertical sidewalls 32 on the ends sloping to the lower opening 34. The hopper 14 is supported on the frame assembly 36 joining the top portion 27 at the corners 38 with vertical members 39 midway on the long sides at 40 with slanted members 41 and on the ends 32 at 42 above the lower opening 34 with members 43. The frame 36 rests in the truck bed on pads 44 at and below the corners of the hopper 14. Inside the hopper 14 a number of separators 46 are positioned therein between the sloping walls 30 and over the lower opening 34. The separators 46 have flat sides 48 sloping to join in a ridge 50 which is parallel to the ends 32 of the hopper 14. The separators 46 are spaced over the opening 46 at intervals approximately the same as their width at the bottom of the sides 48. An open space indicated at 52 is provided in the separators 46 at the rear of the hopper 14 and the separators 46 are spaced therefrom in the forward direction such that a side 48 joins the end member 32 as it would normally join another side; this end member 54 prevents feed placed in the hopper from getting stuck or packed at that end of the hopper 14 above the dried end of the auger 16.

The auger 16 includes a housing, generally indicated at 60, mounted under the lower opening 34 of the hopper 14, having a screw member 62 rotatably mounted therein, preferably driven by an electric motor 64 and chain drive apparatus generally indicated at 66 and a spout 67. The housing 60 has a U-shaped cross section with the closed portion downward and holds the screw member 62 with the shaft 63 in the lower rounded portion thereof supported by the ends of the housing 60. One end 68 of the housing 60 is below the lower opening 34 of the hopper 14 on the normally forward end thereof and the other 70 covers the end of the housing 60 which extends from the normally rear end of the hopper 14. The screw member 62 is preferably conventional grain auger type screw with a helically formed blade 61 supported on the shaft 63. The screw member 62 extends through the length of the housing 60 and is rotated to move feed from the lower opening 34 of the hopper through the housing 60 to be discharged from the spout 67. The spout 67 is positioned on the lower portion of the housing 60 depending at an angle from an extended portion 72 of the housing on the rear end portion thereof. The spout 67 is an open top rectangular shaped trough depending from the extended portion of the housing 72 and having a gate member 74 mounted rotatably therein extending substantially across the opening within the extended portion of the housing 72. The gate 74 rotates downward when feed is pushed through the housing and out the spout 67 and contacts the wobble switch 76. While feed is being forced from the housing 60, the gate 74 remains open; when the flow of feed is stopped, the gate 74 closes. If the hopper 14 contains an adequate supply of feed, the selected portion of feed is dispensed and the gate 74 closes. If on the other hand the hopper 14 does not contain enough feed to dispense the complete portion, the gate 74 closes when no more feed passes and the wobble switch 76 stops the counting as will be explained henceforth.

The shaft 63 of the screw member 62 is rotated by the driving apparatus 66 preferably having a chain drive from the motor 64 and reducing the rotational speed of same by use of an intermediate shaft 78. The screw member is preferably rotated at approximately 30 RPM, which in practice this has been found to provide satisfactory movement of the feed. Mounted with the shaft 63 at the drive end thereof is a counting disc member 80 having a circular disc 82, mounted to rotate with the shaft 63, and preferably having 16 to 18 prong members 84 extending therefrom. The disc member 82 holds the prong members 84 axially parallel with the shaft 63; the prong members 84 are preferably steel bolts with large flattened heads and having the heads extended from the disc 82 away from the auger 16.

The control system 20 includes the motor 64 with solenoid 86, power transformer apparatus 88, relay 90, counter 92, proximity switch 94 and amplifier 96, operating switch 98 and on-off switch 100. The proximity switch 94 is mounted at the drive end of the auger 16 adjacent the disc member 80 in position to sense the heads of the prongs 84 as they move past when the disc 82 is rotating. The other components of the control system 20, with the exception of the motor 64, are contained in a control box preferably mounted in the cab of the pickup truck 12. The motor 64 and proximity switch 94 are equipped with a plug 102 so when the hopper 14 is removed from the bed of the pickup truck 12 they can be easily removed therefrom and the remainder of the control system 20 left mounted with the pickup truck 12 undisturbed. The control system is preferably controlled by the key operated on-off switch 100 and fuse 101 to prevent tampering with the system and for safety precautions for a person performing maintenance or inspection of the auger 16. The power transformer apparatus 88 provides the proper combinations of electrical power for the counter 92, proximity switch amplifier 96 and relay 90. The following specifically named components have been found to give the most satisfactory performance in the herein described control system 20 and pickup truck 12 having a 12-volt electrical system. The transformer apparatus 88 includes a model TY-75A Transformer manufactured by Triad and an oscillating circuit to provide 110 volts A. C. necessary to operate the counter 92 and the proximity switch amplifier 96. The proximity switch is a General Electric model 115 CD1 and the counter a Durrant model 49600-404. The counter 92 has a comparative device for comparing a selected number with a counted number; when they are equal the signaling contacts of the counter are opened thereby signaling the attached circuit. The relay 90 can be any of a multitude of types with one set of normally open and normally closed contacts and operable by 12 volts D. C. Likewise, the solenoid 86 can be any of a number of types operable by 12 volts.

In the preferred normal operation of the automatic feeder 10, the control system 20 is energized by the key operated on-off switch 100 and the ON light 104 comes on to signal the system is on. The amount of feed to be dispensed is selected in multiples of pounds and that number is entered on the counter 92. The number entered on the counter 92 is determined from the density of the feed in pounds divided by the number of prongs 84 on the counter disc 80 multiplied by the amount of feed to be dispensed. The counter 92 will in operation count the number of prongs 84 which pass the proximity switch 94; this is proportioned to the density of the feed. When the operating switch 98 is momentarily actuated preferably by pushing a button, the contacts of the relay 90 actuate the RUN light 106, solenoid 86 to start the motor 64 and the power transformer device 88. Initially the motor 64 runs and feed is moved through the spout 67, and the wobble switch 76 is actuated and thereafter the relay of the counter 92 completes the circuit between the solenoid 86 and relay 90 causing the motor 64 to run when the RUN switch 98 is no longer actuated. Both the counter 92 and motor 64 run until the counter 92 has counted to the pre-set number, then its relay opens the circuit thereby deactivating the relay 90 and solenoid 86 stopping the motor 64 and turning off the RUN light 106. In the event the hopper 14 does not contain a sufficient amount of feed to dispense in a particular portion, the wobble switch 76 opens stopping the counting and opening the circuit deactivating the relay 90, solenoid 86 and motor 64 whereupon the operator can refill the hopper 14, return to where he was placing the feed and upon pressing the operating button 98 reactivate the control system 20 thereby resuming counting at the number as before.

In preferred normal operation the automatic feeder 10 is charged with feed; the truck 12 is driven to the feed lot or to wherever the livestock are, and the feed is distributed either on the ground or in a feeding trough. Only one person is normally required to operate the automatic feeder of this invention since the controls of the feeder 10 are located within the cab of the truck 12. When the feeding is complete, the hopper can be covered by a cover 110, like that indicated in FIG. 1. The cover 110 is preferably tied to the sloping sides 30 of the hopper 14 and supported in the center of the hopper 14 by a ridge pole 112. Covering the hopper 14 prevents an undue amount of moisture from entering the hopper 14 and thereby causing the feed to become contaminated from moisture. Also, when the hopper 14 is empty or mostly empty, it can be easily lifted from the truck 12 or slid from the truck 12 on the frame pads 44; thus the truck 12 is not unduly limited in its use with the automatic feeder 10.

In the use and operation of the automatic feeder 10 of this invention, it is seen that same provides a feed container hopper 14 with auger 16 and control system 20 easily mounted with a conventional pickup truck 12 allowing one to easily and relatively rapidly distribute feed to livestock. The hopper 14 and auger 16 of this invention are easily carried by a pickup truck 12 having overload springs and can be relatively rapidly removed therefrom when not in use.

As will become apparent from the foregoing description of the applicant's automatic feeder, relatively inexpensive means have been provided to readily receive and distribute dry type feed to livestock. The automatic feeder is simple to use, portable and easily adapted to a common and conventional pickup truck.

While the invention has been described in conjunction with preferred specific embodiments thereof, it will be understood that this description is intended to illustrate and not limit the scope of the invention, which is defined by the following claims.

I claim:

1. An automatic feeder mountable on a vehicle for movement thereof, comprising:
   a. frame means,
   b. a hopper means supported and mounted on said frame means,
   c. an auger means mounted relative said hopper means to receive material therefrom,
   d. a spout means mounted with said auger means to discharge material therefrom,
   e. powering means operably connected to said auger means, and
   f. control means operably connected to said powering means to control the operation of same and in turn said auger means, said control means having a counter means, a counting wheel member mounted to rotate with the screw of said auger means, position sensing means and material discharge sensing means, and said counting wheel member having a prong member mounted thereon on the perimeter thereof, said prong member in operation actuating said position sensing means and said counter means, and said control means operable to automatically regulate said power means to in turn operate said auger means to deliver a substantially certain amount of material out through said spout means from said hopper means, and stop rotation of said screw when said amount of material has been discharged and when said screw is rotating and not dispensing material, said automatic feeder mountable for movement on said vehicle with said spout means extending over the side or end thereof in position to deliver material therefrom.

2. The automatic feeder as described in claim 1 wherein:
   a. said hopper means has an elongated rectangular planform with sidewalls defining a funnel shaped receptacle having an open top portion and inwardly sloping sidewalls on the long sides thereof, and vertical walls on the ends thereof forming a regular elongated rectangular shaped outlet on the bottom portion thereof large enough to receive and pass range cubes and joining said auger means, and said hopper means has inside same a plurality of separator members transversely positioned above said lower opening, b. said auger means has an elongated housing member and extends substantially from said hopper means and has said spout means mounted to depend from said auger housing and extend transverse said housing and substantially from the end portion thereof, and c. said control means has said counter means, said position sensing means mounted with said frame means and said material discharge sensing means mounted with said auger means, said control means operable in conjunction with said powering means to control the discharge of said certain amount of material from said hopper means, said automatic feeder is operable to contain said range cube feed material in said hopper means for distribution to cattle or the like, and said control means operates to detect said amount of material in units by said counting wheel member and said position sensing means and its dispersal by said material sensing means, said feed is measured by said counting means, and the rotation of said screw is stopped when said amount of material has been dispensed and rotation of said auger screw member is stopped when said feed sensing means indicate said feed is not being dispensed.

3. The automatic feeder as described in claim 1, wherein:

a. said hopper means has a box shaped top portion above said sloping sidewalls, said sidewalls and said end walls extend from said top portion to said outlet, said outlet has substantially less width than said top portion and is positioned in the center portion relative said top portion, and said outlet has substantially the same length as said top member, said separator members have an inverted V-shape, extend transversely between said sloping sidewalls at the lower portion thereof and have space between same substantially the same as their width, b. said housing member of said auger means has a U-shape in cross section with said screw mounted in the lower rounded portion thereof and the inlet portion of the upper open portion thereof mounted with said hopper means outlet, and has said powering means, said counting wheel member and said rotation sensing means mounted therewith on one end thereof and thereunder said hopper means, said housing member extends from the opposite end of said hopper means, has a cover member thereover, and said spout means is mounted on the lower curved portion of said housing member, c. said frame means has members attached to the corners of said hopper and at points midway on the long sides of said top portion thereof and at said lower opening of said vertical end walls, joining and forming legs depending from said corners, and d. said counting wheel has spaced prong members extending therefrom on the perimeter thereof, said prongs in operation activating said position sensing means and said counter means.

* * * * *